INVENTOR
Grady L. Roberts
BY
AGENT

United States Patent Office 3,470,261
Patented Sept. 30, 1969

3,470,261
CONTROL OF ALKYLATION CATALYST
ACTIVITY
Grady L. Roberts, Texas City, Tex., assignor to Monsanto
Company, St. Louis, Mo., a corporation of Delaware
Filed June 28, 1967, Ser. No. 649,619
Int. Cl. C07c 3/52; G01n 23/00
U.S. Cl. 260—671                14 Claims

ABSTRACT OF THE DISCLOSURE

A process for determining and controlling the activity of a Friedel-Crafts catalyst used in the preparation of alkylated aromatic compounds which comprises monitoring the absorption spectrum of the catalyst complex and adjusting the addition of metal halide and hydrogen halide to said catalyst complex to maintain predetermined absorbance values or ratios thereof.

Background of the invention

The present invention concerns an improved process for alkylating an aromatic hydrocarbon in the presence of a Friedel-Crafts type catalyst. More particularly, this invention relates to a method and apparatus for continuously determining the catalyst activity during the process of alkylation of an aromatic hydrocarbon with an olefin and controlling the addition of catalyst to the process to maintain it at the desired predetermined level.

The reaction of alkylating agents such as olefins and alkyl halides with aromatic compounds in the presence of a metal halide and a hydrohalic acid is well known and widely used in industry. It is well understood that in this reaction the active catalyst is not the solid metal halide itself, but an organo-metal halide complex comprising the metal halide and aromatic compounds and also comprising some of the alkylated aromatic compounds and the hydrohalic acid. This substance, commonly termed "catalyst complex," resembles a heavy oil in consistency, is usually deep red in color, and has a somewhat variable composition depending upon the reactants in the system.

In the usual continuous operation, the aromatic hydrocarbon and the olefin are reacted in the presence of an aluminum chloride catalyst complex to produce an alkylated liquor. The catalyst complex is prepared separately and circulated continuously to the alkylation reactor. Catalyst complex is readily separated from the alkylated liquor, because of the difference in specific gravities, by flowing the reaction mixture into a separator provided with separate draw-off lines for the lighter alkylated liquor and the heavier catalyst complex. The catalyst complex is then returned to the reactor for reuse.

Over a period of time, the catalyst complex gradually loses its activity and it is common practice in the art to refortify it with fresh aluminum chloride and hydrogen chloride to revive its catalytic properties. While the existence of the problem of periodically determining and controlling the catalyst activity has been generally recognized, there has not been found a simple and accurate means for determining catalyst activity in order to maintain it at the high level required in the process for maximum efficiency and to prevent the catalyst complex from "losing its activity" which necessitates recharging the reactor with fresh catalyst. Many methods have been suggested for measuring catalyst activity but most of these are either long tedious analytical procedures or are not reliable enough in the critical range needed.

Summary

It has now been discovered that Friedel-Crafts catalyst complexes possess characteristic radiant energy absorption spectra which are dependent upon the activity of the catalyst complex and which can be utilized as part of a process for controlling the activity of said catalyst complex. Consequently, by monitoring the absorption spectrum of a catalyst complex layer, the activity of the complex can be continuously checked and fortification of the complex, if needed, can be carried out. It is well known that the ability of catalyst complex to convert benzene and ethylene to ethylbenzene is a direct indication of its activity—a highly active catalyst complex produces a reaction liquor containing a higher percentage of ethylbenzene than does one which is less active. Also as the catalyst activity decreases, the amount of ethylene converted to ethylbenzene decreases such that for a constant ethylene feed-gas rate, the ethylene off-gas rate will increase rapidly. The results from a typical alkylation run are shown in the table below wherein the weight percent of ethylbenzene in the alkylate is compared with the ethylene off-gas rate, the absorbances at 460 and 375 m$\mu$ and the ratio of the absorbance at 460 m$\mu$ to that at 375 m$\mu$ over a period of time beginning with the initial contact of the reactants with the catalyst complex. These data were obtained in a continuous laboratory-scale alkylation begun with a catalyst of high activity and designed to lower the activity of the catalyst complex as it was used without any fortification treatment.

TABLE 1

| Reaction time, hr. | Off-gas rate, 1/hr. | EB in alkylate, wt. percent | Absorbance 375 m$\mu$ | Absorbance 460 m$\mu$ | Absorbance 460 m$\mu$/ Absorbance 375 m$\mu$ |
|---|---|---|---|---|---|
| 0 | | | 1.33 | 0.18 | 0.14 |
| 1 | 0.8 | 36.1 | 1.16 | 0.41 | 0.35 |
| 2 | 0.9 | 37.7 | 1.09 | 0.68 | 0.62 |
| 2 | 1.4 | 37.3 | 1.05 | 0.86 | 0.79 |
| 4 | 1.5 | 35.5 | 0.92 | 1.04 | 1.17 |
| 4.5 | 22.5 | 20.5 | 0.60 | 1.00 | 1.63 |

As is readily apparent from the preceding data, the ethylene off-gas rate and the ethylbenzene concentration of the alkylate, both of which are measures of catalyst activity, correlate well with the absorbances at 460 m$\mu$ and 375 m$\mu$ and with the ratio of the absorbances at 460 m$\mu$ to that at 375 m$\mu$. Thus, it is seen that by using the discovery of the present invention the activity of the catalyst complex can be easily monitored during the course of the alkylation reaction.

It is an object, therefore, of the present invention to provide a simple, sensitive and inexpensive method of determining the alkylation catalyst activity when alkylating an aromatic hydrocarbon with an olefin in the presence of a metal halide catalyst complex.

It is also an object of the present invention to provide an improved alkylation process.

It is a further object of the present invention to provide an apparatus for determining alkylation catalyst activity.

Still another object of the present invention is to obtain a continuous and accurate control means for maintaining the activity of the catalyst complex in an alkylation process.

Further objects and advantages of the invention will be apparent from the following description, the drawings and the appended claims.

Description of the preferred embodiment

Figure 1:
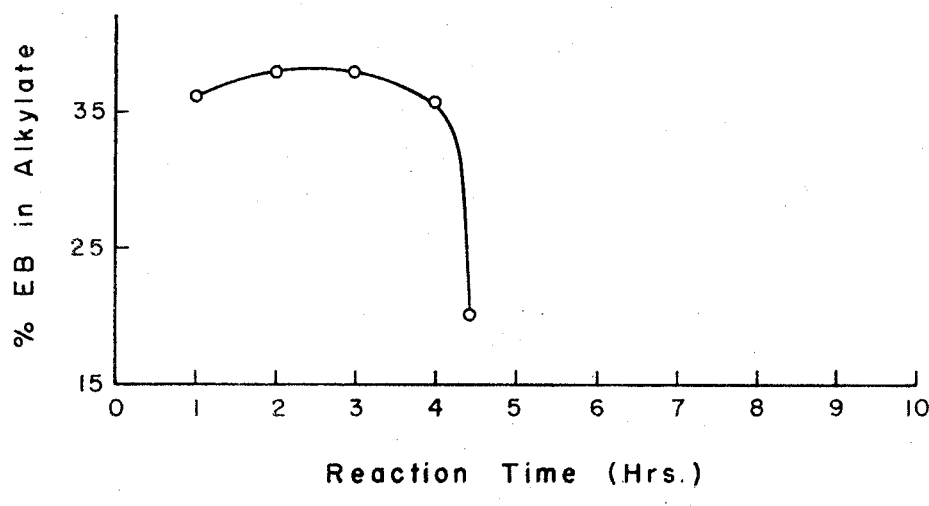
FIGURE 1 is a graphic representation of the data in Table 1 above and shows the relationship between the ratios of the absorbances at 460 m$\mu$ to that at 375 m$\mu$, the ethylene off-gas rate and percent ethylbenzene in the alkylate as a function of reaction time.
Figure 1:
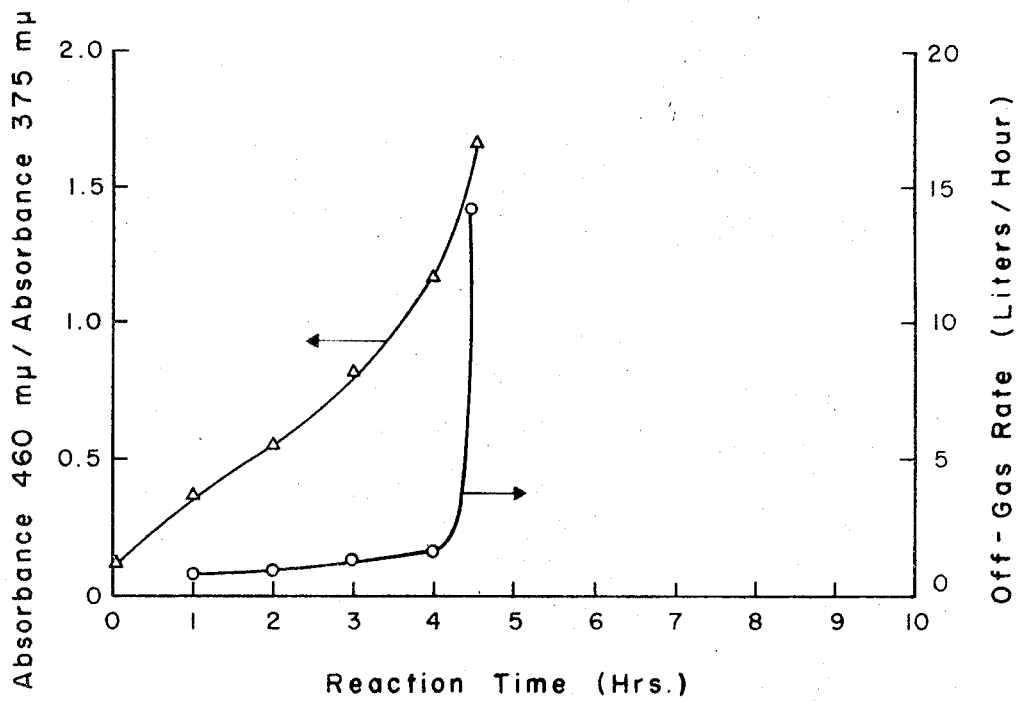
Figure 2:
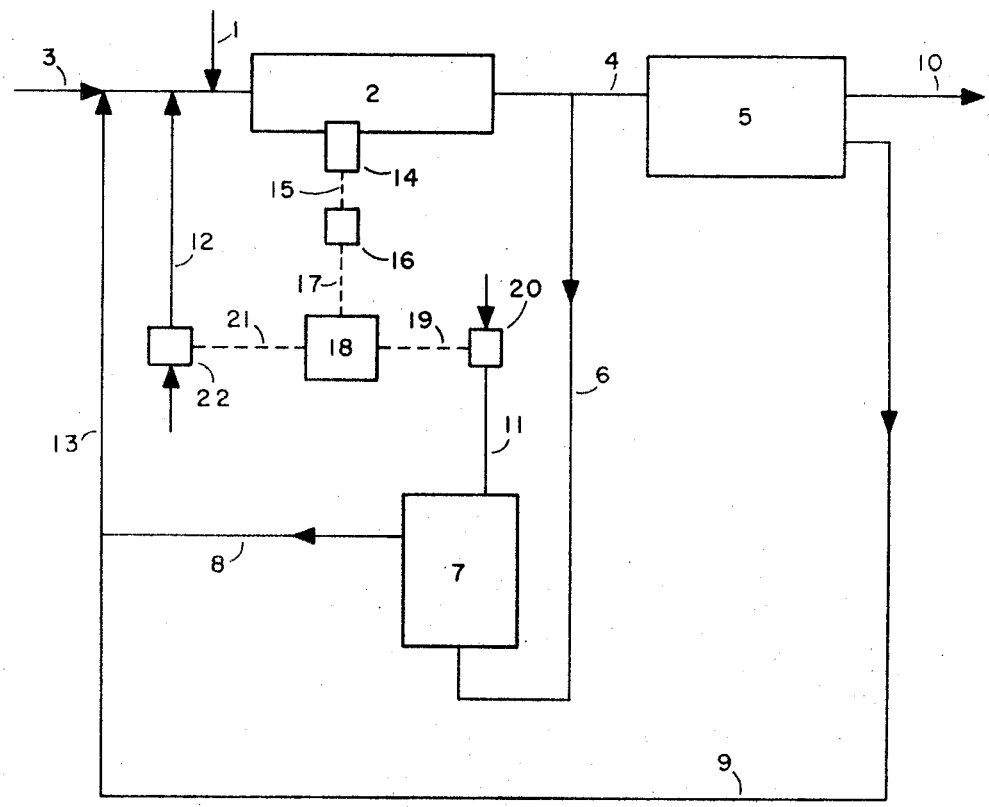
FIGURE 2 is a simplified diagrammatic flow sheet of the improved alkylation process of the invention.

Referring now to FIGURE 2, the reactants consisting of ethylene via line 1, dry benzene and polyethylbenzenes via line 3, hydrogen chloride via line 12 plus refortified and recycle catalyst complex via line 13 are fed to alkylator 2. The reaction mixture, after passing through a series of coolers, not shown, flows through line 4 to separator 5 where the alkylate formed in the alkylators is separated from the catalyst complex. A small sidestream of the reaction flows through line 6 to AlCl$_3$ mixer 7 where it dissolves AlCl$_3$ and overflows through line 8 into catalyst complex stream 9 from the bottom of the separator. From the separator, the alkylate flows through line 10 to the washing and distallation train for recovery of ethylbenzene. The catalyst complex layer flows out of separator 5 and is joined by the refortified reaction mixture via line 8 from AlCl$_3$ mixer 7. The combined streams flow to the alkylators via line 13.

Radiant energy absorbance monitor 14 is adapted to alkylator 2 such that the desired absorbance ratio of the catalyst complex being formed in alkylator 2 is continuously determined. A signal generated in monitor 14 corresponding to the value of the desired absorbance ratio is transmitted through line 15 to a suitable recorder 16 to provide a direct scale reading indicative of the activity of the catalyst complex. When this reading rises above the predetermined value, the amounts of hydrogen chloride entering alkylator 2 via line 12 and AlCl$_3$ entering AlCl$_3$ mixer 7 via line 11 are increased sufficiently to restore the catalyst activity to the desired level. This regulation may be manual or it may be automatic. If control is to be automatic, when the reading on the recorder rises above the predetermined level, a suitable signal is transmitted through line 17 to controller 18 which can be electric, pneumatic, hydraulic, or of any other recognized means. The control signal generated in controller 18 is transmitted through line 19 to flow control valve assembly 20 to permit more AlCl$_3$ to pass through line 11 to AlCl$_3$ mixer 7. At the same time, a signal from controller 18 is sent through line 21 to flow control valve assembly 22 to increase the quantity of hydrogen chloride entering alkylator 2 through line 12.

Figure 3:
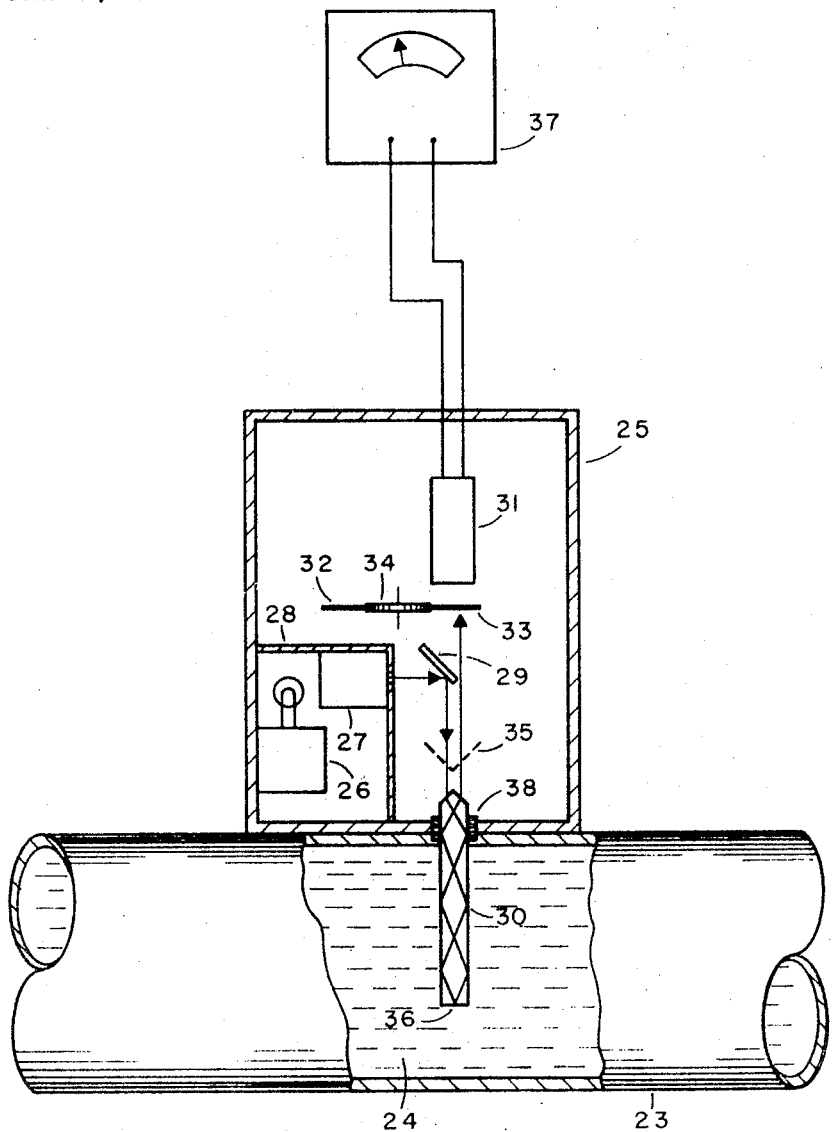
FIGURE 3 is a diagrammatic representation of a radiant energy absorbance monitor depicted as 14 in FIGURE 2.

In FIGURE 3, there is set forth an embodiment of radiant energy absorbance monitor 14 mentioned above. As herein described, radiant energy absorbance monitor 14 utilizes the principles of attenuated total reflectance although it is to be understood that simple transmission techniques may also be employed. Briefly, the technique of attenuated total reflectance involves contacting the material whose spectrum it is desired to obtain with one or more surfaces of an optical crystal, such as, for example, a sapphire prism, and passing a beam of radiant energy into the crystal such that it impinges one or more times on the interface of the crystal and the material at an angle greater than the critical angle and then passes out of the crystal to a suitable detector. The critical angle is defined as the least angle between the incident light ray and the normal to the interface of two media having different refractive indices, at which total reflection occurs. Under these circumstances, some of the radiant energy impinging on the interface or interfaces is selectively absorbed, depending on the wave length, by the contacted material. The advantage of the technique resides in being able to easily obtain the absorption spectrum of intensely absorbing material without the necessity of dilution techniques or using cells of extremely short path lengths. Thus, in this case, the attenuated total reflectance technique is ideally suited for the present application inasmuch as the catalyst complex is an extremely intense absorber of radiant energy in the wave length regions utilized. It is to be emphasized, however, that the scope of this invention is not limited to the technique of attenuated total reflectance for obtaining the absorption spectrum of the catalyst complex. For example, one could use absorption cells of extremely short path lengths or use suitable solvents for diluting the catalyst complex or the like. The use of the attenuated total reflectance technique for monitoring the catalyst complex activity is particularly advantageous for use in a process analyzer where the measurement of the absorption of radiant energy by a material is to be done in a flowing stream, reactor vessel or the like.

Referring to FIGURE 3, there is shown pipe 23 which serves to carry catalyst complex 24 to an alkylator or pipe 23 may be part of an alkylator, such as alkylator 2 in FIGURE 2. Instrument casing 25 is adapted to be placed against the outer surface of pipe 23 in the manner shown. Instrument casing 25 houses radiant energy source 26 which emits radiant energy of a wave length range from 300 to 600 m$\mu$. Radiant energy source 26 and beam collimator 27 are further enclosed in source housing 28. A beam of radiant energy of wave length 300 to 600 m$\mu$ passes out of collimator 27 and is reflected off front surface mirror 29 into sapphire optical crystal 30 which is mounted in pipe 23 by means of seal 38. At the points where the radiant energy beam impinges on the sapphire optical crystal 30—catalyst complex 24 interface, some of the radiant energy of wave length 460 m$\mu$ and 375 m$\mu$ is absorbed by the catalyst complex, the amount of absorption at each wave length being dependent on the activity of the catalyst complex. Since it is desired to pass only the two wave lengths of radiant energy mentioned above to detector 31, the radiant energy beam emerging from sapphire optical crystal 30 impinges on one of two interference filters 32 or 33 mounted on rotatable wheel 34. One of the filters is selected to pass a band centered at 460 m$\mu$ and the other at 375 m$\mu$. The intensity of each band passing through filters 32 or 33 is detected, measured and amplified at detector means 31 which can be a photocell or other suitable radiant energy detector. In the preferred case, detector means 31 is such that it determines the ratio of the absorbances at 460 m$\mu$ to that at 375 m$\mu$. This absorbance ratio can be read out at calibrated meter 37 and compared with a predetermined absorbance ratio to determine if refortification of the catalyst complex is needed. Refortification, if required, can then be carried out manually. If, on the other hand, control is to be automatic, when the ratio reading on the recorder rises above a predetermined value, a suitable signal can be transmitted from meter 37 to a control means similar to controller 18 described above in FIGURE 2. Ninety-degree mirror 35 is periodically placed in the radiant energy beam path in order to allow detector means 31 and meter 37 to be set to zero position, i.e., where no absorption by catalyst complex 24 takes place. In this manner, the activity of the catalyst complex can be determined and controlled under process conditions.

In a preferred embodiment, the sapphire optical crystal 30 is comprised of a cylindrical section and a conical section, the surface of the conical section making an angle of 48° with the long axis of the cylindrical section. It is also necessary, to achieve optimum results, that the sapphire optical crystal be optically polished. In this preferred embodiment, the flat end surface 36 of crystal 30 is coated with a highly reflecting metal surface such as rhodium or platinum.

Although but a single embodiment of the present invention for measuring the catalyst activity under process conditions has been illustrated and described, it is to be expressly understood that the invention is not limited thereto. Various changes may be made in the design and arrangement of the components without departing from the spirit and scope of this invention as will be readily apparent to those skilled in the art. It is also to be understood that the catalyst activity may be monitored by laboratory methods, i.e., by removing a sample of catalyst complex and using conventional spectrophotometric equipment available in most laboratories.

The process and apparatus of the present invention are particularly useful in the preparation of ethylbenzene wherein benzene, ethylene, polyethylbenzenes, and the preformed Friedel-Crafts catalyst complex, which is usually a complex of aluminum chloride, polyethylbenzenes, and hydrogen chloride are reacted together. However, while the process of the present invention has been described with special reference to the preparation of ethylbenzene, it may be applied to producing other alkylated aromatic compounds. For example, the process may be employed in reacting ethylene with toluene to produce ethyltoluenes, in reacting propylene with benzene to produce isopropylbenzene or polypropylbenzenes, in reacting butylene with benzene to form a butylbenzene or polybutylbenzenes, and the like.

The process of this invention is also applicable to dealkylation processes. It is well known that polyalkyl aromatic compounds such as polyethylbenzenes may be reacted with an aromatic compound such as benzene in the presence of a Friedel-Crafts organo-metallic halide catalyst complex to yield a mono-alkylated compound such as ethylbenzene. The same problems of maintaining catalyst activity are presented in such dealkylation processes. The method of this invention may be utilized as successfully in such dealkylation processes as it is in the alkylation process above described.

The process of this invention is also applicable in combined alkylation-dealkylation processes and for methods where the polyalkylated aromatic compound is returned to the alkylation reaction whence it serves to suppress the further formation of polyalkylated material and to direct the reaction to the formation of the mono-alkylated product. Procedures for carrying out such reactions are well known and need not be given in detail.

Furthermore, although the invention has been described with special reference to using the absorbance ratios to determine catalyst activity, it is to be expressly understood that the invention is not limited thereto; the absorbance values may be used directly without obtaining the ratios.

What is claimed is:

1. In a process for the preparation of alkylated aromatic compounds wherein an olefin is reacted with an aromatic compound in the presence of a Friedel-Crafts organo-metal halide catalyst complex and wherein said catalyst complex activity is maintained by the addition of fresh metal halide and hydrogen halide, the steps which comprise measuring the absorption of radiant energy by said catalyst complex and regulating the addition of the metal halide and the hydrogen halide to said catalyst complex with respect to a predetermined absorbance value by supplying a sufficient quantity of metal halide and hydrogen halide to said catalyst complex whenever said absorption of radiant energy varies from said predetermined absorbance value.

2. The process of claim 1 wherein said alkylated aromatic compounds are ethylbenzenes, said olefin is ethylene, said aromatic compound is benzene, said organo-metal halide catalyst complex is a complex of aluminum chloride, hydrogen chloride and ethylbenzenes.

3. The process of claim 2 wherein said absorption of radiant energy by said catalyst complex is measured at 460 and 375 m$\mu$, the ratio of the absorbance measurement at 460 m$\mu$ to that at 375 m$\mu$ is obtained, and the addition of the aluminum chloride and hydrogen chloride to said catalyst complex is regulated with respect to a predetermined ratio of said absorbance measurements by supplying a sufficient quantity of aluminum chloride and hydrogen chloride to said catalyst complex whenever said ratio exceeds said predetermined ratio.

4. The process of claim 3 wherein said absorption of radiant energy by said catalyst complex is measured by contacting said catalyst complex with one or more exterior surfaces of an optical crystal into which a beam of radiant energy is directed such that said beam impinges one or more times on the interface of said optical crystal and said catalyst complex at an angle greater than the critical angle and thence out of said optical crystal onto a radiant energy detector.

5. In a process for the preparation of a monoalkylated aromatic compound wherein polyalkylated aromatic compounds are dealkylated in the presence of a Friedel-Crafts organo-metal halide catalyst complex and wherein said catalyst complex activity is maintained by the addition of fresh metal halide and hydrogen halide, the steps which comprise measuring the absorption of radiant energy by said catalyst complex and regulating the addition of the metal halide and the hydrogen halide to said catalyst complex with respect to a predetermined absorbance value by supplying a sufficient quantity of metal halide and hydrogen halide to said catalyst complex whenever said absorption of radiant energy varies from said predetermined absorbance value.

6. The process of claim 5 wherein said monoalkylated aromatic compound is ethylbenzene, said polyalkylated aromatic compounds are polyethylbenzenes, said organo-metal halide catalyst complex is a complex of aluminum chloride, hydrogen chloride and ethylbenzenes.

7. The process of claim 6 wherein said absorption of radiant energy by said catalyst complex is measured at 460 and 375 m$\mu$, the ratio of the absorbance measurement at 460 m$\mu$ to that at 375 m$\mu$ is obtained, and the addition of the aluminum chloride and hydrogen chloride to said catalyst complex is regulated with respect to a predetermined ratio of said absorbance measurements by supplying a sufficient quantity of aluminum chloride and hydrogen chloride to said catalyst complex wherenever said ratio exceeds said predetermined ratio.

8. The process of claim 7 wherein the absorption of radiant energy by said catalyst complex is measured by contacting said catalyst complex with one or more surfaces of an optical crystal into which a beam of radiant energy is directed such that said beam impinges one or more times on the interface of said optical crystal and said catalyst complex at an angle greater than the critical angle and thence out of said optical crystal onto a radiant energy detector and the activity of said catalyst complex is thereby determined.

9. A method for determining the activity of a Friedel-Crafts organo-metal halide catalyst complex used for the monoalkylation of an aromatic compound by the reaction of an olefin with said aromatic compound wherein both mono- and polyalkylated aromatic compounds are produced and said polyalkylated aromatic compounds are dealkylated in the presence of said catalyst complex which comprises measuring the absorption of radiant energy by said catalyst complex at at least one wavelength in the region from 300 to 600 m$\mu$.

10. The method of claim 9 wherein said monoalkylated aromatic compound is ethylbenzene, said olefin is ethylene, said aromatic compound is benzene, said organo-metal halide catalyst complex is a complex of aluminum chloride, hydrogen chloride and ethylbenzene, and said polyalkylated aromatic compounds produced are polyethylbenzene.

11. The method of claim 10 wherein the absorption of radiant energy by said catalyst complex is measured at 460 and 375 m$\mu$ and the ratio of the absorbance measurement at 460 m$\mu$ to that at 375 m$\mu$ is used to determine the activity of the catalyst complex.

12. The method of claim 11 wherein said absorption of radiant energy by said catalyst complex is measured by contacting said catalyst complex with one or more exterior surfaces of an optical crystal into which a beam of radiant energy is directed such that said beam impinges one or more times on the interface of said optical crystal and said catalyst complex at an angle greater than the critical angle and thence out of said optical crystal onto a radiant energy detector.

13. An apparatus for measuring the activity of alkylation catalyst complex in a vessel comprising in combination a source of radiant energy, an optical crystal, a portion of the exterior surface of which is contacted with said catalyst complex, a means for directing a beam of said radiant energy into said optical crystal such that said beam of said radiant energy impinges on the interface of said optical crystal and said catalyst complex whereby a portion of said radiant energy is absorbed by said catalyst complex, the remaining portion of radiant energy being reflected out of said optical crystal, a means for allowing only selected wavelength regions of said remaining portion of radiant energy to be transmitted, a detector for determining the intensity of the selectively transmitted beams of said radiant energy and a means connected to said detector for indicating the intensity of the selectively transmitted and detected beams.

14. The apparatus of claim 13 wherein the optical crystal is a sapphire rod having a cylindrical section and a conical section, the surface of said conical section making an angle of 48° with the long axis of said cylindrical section.

References Cited
UNITED STATES PATENTS

| | | | |
|---|---|---|---|
| 2,592,063 | 4/1952 | Persyn | 23—253 |
| 2,846,489 | 8/1958 | McDonald | 260—671 |
| 3,303,230 | 2/1967 | McMinn | 260—671 |

DELBERT E. GANTZ, Primary Examiner

C. R. DAVIS, Assistant Examiner

U.S. Cl. X.R.

356—103; 250—218; 23—253; 260—672